(12) United States Patent
Franke et al.

(10) Patent No.: US 6,449,699 B2
(45) Date of Patent: *Sep. 10, 2002

(54) APPARATUS AND METHOD FOR PARTITIONED MEMORY PROTECTION IN CACHE COHERENT SYMMETRIC MULTIPROCESSOR SYSTEMS

(75) Inventors: Hubertus Franke, Cortlandt Manor, NY (US); Douglas J. Joseph, Danbury, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,934
(22) Filed: Mar. 29, 1999
(51) Int. Cl.[7] ............................................. G06F 12/00
(52) U.S. Cl. ..................... 711/147; 711/173; 711/163; 711/152; 711/153
(58) Field of Search .................... 711/147, 148, 711/152, 151, 153, 154, 163, 173

(56) References Cited

U.S. PATENT DOCUMENTS

| | | | |
|---|---|---|---|
| 3,827,029 A | | 7/1974 | Schlotterer et al. |
| 4,811,216 A | * | 3/1989 | Bishop et al. ............... 364/200 |
| 4,814,982 A | | 3/1989 | Weir |
| 4,843,541 A | | 6/1989 | Bean et al. |
| 5,295,260 A | * | 3/1994 | Pribnow ..................... 395/575 |
| 5,796,605 A | * | 8/1998 | Hagersten ................... 364/134 |
| 5,845,071 A | | 12/1998 | Patrick et al. |
| 5,875,464 A | * | 2/1999 | Kirk ........................... 711/129 |
| 5,887,138 A | * | 3/1999 | Hagersten ............... 395/200.45 |
| 5,890,189 A | * | 3/1999 | Nozue et al. ................ 711/100 |
| 6,088,770 A | * | 7/2000 | Tarui et al. .................. 711/148 |

FOREIGN PATENT DOCUMENTS

WO    99/17196   * 9/1997   ....................... 9/46

* cited by examiner

Primary Examiner—Do Hyun Yoo
Assistant Examiner—Kimberly N McLean
(74) Attorney, Agent, or Firm—Scully, Scott, Murphy & Presser; Douglas W. Cameron (57) ABSTRACT

The present invention provides fault contained memory partitioning in a cache coherent, symmetric shared memory multiprocessor system while enabling fault contained cache coherence domains as well as cache coherent inter partition memory regions. The entire system may be executed as a single coherence domain regardless of partitioning, and the general memory access and cache coherency traffic are distinguished. All memory access is intercepted and processed by the memory controller. Before data is read from or written to memory, the address is verified and the executed operation is aborted if the address is outside the memory regions assigned to the processor in use. Inter cache requests are allowed to pass, though concurrently the accessed memory address is verified in the same manner as the memory requests. During the corresponding inter cache response, a failed validity check for the request results in the stopping of the requesting processor and the repair of the potentially corrupted memory hierarchy of the responding processor.

31 Claims, 5 Drawing Sheets

APPARATUS AND METHOD FOR PARTITIONED MEMORY PROTECTION IN CACHE COHERENT SYMMETRIC MULTIPROCESSOR SYSTEMS

BACKGROUND OF THE INVENTION

1. Field of the Invention

This invention relates to shared memory based symmetric multiprocessor systems, and more specifically, to an apparatus and method for partitioning and managing memory in a shared memory based multiprocessor system into independent, fault contained domains.

2. Description of Prior Art

Modern computer systems are increasingly comprised of symmetric shared memory based multiprocessor systems (SMPs). SMPs are regularly partitioned and physical resources, such as processors and memory, are assigned to partitions each executing their own operating system. For reliability, availability and serviceability reasons, memory assigned to a partition must be protected from being accessed by other partitions.

The translation and protection mechanisms provided by individual operating systems can be either accidentally or maliciously circumvented to allow access to memory assigned to other partitions. Conceptually this problem can be solved by intercepting all bus traffic and subject this traffic to access verification through determining whether a particular processor is allowed to access a particular memory segment. However, modern cache coherent symmetric multiprocessor systems such as the Intel Pentium Pro and Pentium II enforce very tight timing constraints on their bus to alleviate the problem of bus occupancy.

In particular, cache snooping protocols do not allow any extra cycles to intercept the address put on the bus, verifying it and aborting a transaction upon any access violation, all before the snooping of other processors starts. Typically, once the address is visible on the address bus, the next signal latch initiates the cache snooping. If indeed a processor puts an address outside its assigned memory onto the bus, this request could be filled by a processor outside the originating partition, resulting in invalid cache states, e.g., inter-cache transfers with cache invalidates, leading to inconsistent memory state that cannot be recovered from.

While mechanisms exist that rely on changes to the processor core and the bus architecture, these are typically limiting in terms of addressability and in terms of establishing cache coherent shared memory between the partitions for the purpose of cache coherent inter-partition communication. Having thus given a general overview of the problem area, what is hence needed is an apparatus and a method that provides fault contained memory partitioning while preserving cache coherence domains.

Some attempts at addressing problems similar to these being solved by the present invention are introduced below.

1. A commonly owned, co-pending U.S. patent application Ser. No. 09/256,035 entitled "Secure Partitioning of Shared Memory Based Multiprocessor System" filed on Feb. 23, 1999, describes an apparatus which establishes cache coherence domains in an SMP node. That apparatus replicates the internal system bus and uses a configurable crossbar switch to connect each of the system components, such as processors, I/O controllers and interrupt controllers to one of the internal busses. All components connected to the same internal bus form a coherence domain.

The apparatus further utilizes memory controller modifications to re-map the real addresses on each internal bus to physical memory. This system was designed to provide 0-based memory to each partition in order to avoid system software changes. It may establish non coherent shared memory regions between partitions by relocating certain real address ranges of different partitions into the same physical memory.

That invention specifically circumvents the problem of domain protection on the same bus, and is further limited by the pin-count of the crossbar switch.

2. U.S. Pat. No. 5,796,605 issued Jul. 2, 1996 describes a technique for system memory space address mapping in a multiprocessor computer system. The disclosed mapping architecture may be applied to a multiprocessor computer system having SMP nodes, where each processing node may include multiple processors. The system memory address space is split into different regions such that each of n SMP nodes is assigned 1/n of the total address space. By assigning 1/n of the global shared memory region to each node, it establishes memory locality that is used in a specific cache coherency protocol to utilize this locality based on the state of operation. In this regard this reference does not deal with partitioning for the purpose of establishing different fault protected system partitions, it neither provides memory partitioning on a single SMP node nor provides inter-partition shared memory regions.

3. U.S. Pat. No. 5,845,071 issued Dec. 1, 1998 describes the partitioning of a multi-node multiprocessor system with globally shared memory into groups of nodes called error containment clusters of nodes or ECCNS. The nodes would be partitioned such that an ECCN resides on a column of nodes or a row of nodes. Within each ECCN there is coherent memory sharing. Between the ECCNs, the communication is through a messaging protocol. The memory within each node is also partitioned into protected and unprotected memory. Unprotected memory is used for messaging and protected memory is used for sharing. A failure in an error containment cluster would corrupt the memory within that cluster, specifically the protected memory within that cluster and also the unprotected memory used by that cluster to communicate with the other clusters. However, the other clusters could continue to run because their protected memory would be unaffected, and could continue to communicate through the remaining unprotected memory.

This patent deals with partitioning clusters and not with partitioning of a single SMP node. It establishes protection domains along SMP boundaries and as such does not deal with partitioning a single SMP. Furthermore, it sets aside special unprotected memory coupled with message passing for inter partition communication to avoid the loss of coherency state that arises when one of the nodes become inoperable.

4. U.S. Pat. No. 3,827,029 dated Jul. 30, 1974 describes a hardware memory violation protect subsystem that may be added to a computer system as a hardware option. The memory protect subsystem includes hardware which may operate in parallel with the computer system memory subsystem and which monitors each attempt to alter data within the memory subsystem. Any attempt to alter data within a protected region may be defeated. Following such an attempt, program execution is interrupted and program control is transferred to the computer system executive software. Although this patent addresses memory protection, it does not address issues of partitioning or problems arising due to the presence of caches and cache coherency traffic, namely illegal inter-cache line transfers.

5. U.S. Pat. No. 4,843,541 issued Jun. 27, 1989, describes a method of logically partitioning an IBM S/370XA Mainframe computer, and requires support from hardware, software and I/O devices. Absolute and virtual addresses of the different operating systems, as well as page addresses for any expanded storage, are relocated into, their assigned partitions. However, this patent does not establish multiple SMP protected memory domains in the same coherence domain on the same bus.

6. U.S. Pat. No. 4,814,982 dated Oct. 9, 1987, describes a system that assigns identifiers to individual processors or input/output (I/O) module for use in controlling access to global memory. The primary focus of this patent is to achieve fault tolerance by replicating processing function and detecting faults to allow takeover on another processor. This patent uses a modified memory controller that separates memory ranges via a processor/task identifier.

However, this patent does not deal with cache coherency issues resulting from executing multiple system images on the same shared bus; the protection is built into the devices attached to the bus, thus at a cost of providing such mechanisms in the devices, faulty addresses do not show up on the bus. Inter-partition communication is not dealt with by this patent. Finally, a number of segments are required to equal the number of processing elements.

SUMMARY OF THE INVENTION

The present invention introduces an apparatus and a method for providing fault contained memory partitioning in a cache coherent, symmetric shared memory multiprocessor system while enabling fault contained cache coherence domains as well as cache coherent inter partition memory regions. The entire system may be executed as a single coherence domain regardless of partitioning, and the general memory access and cache coherency traffic are distinguished.

All memory access is intercepted and processed by the memory controller. Before data is read from or written to memory, the address is verified and the executed operation is aborted if the address is outside the memory regions assigned to the processor in use. Accordingly, when this happens, the offending processor is stopped. The inventive apparatus and method utilizes a per partition memory access map, identifying the ranges of memory that a particular processor may access. By allowing overlaps in these access maps, cache coherent inter partition shared memory regions may be established, to facilitate the efficient implementation of shared locks and other inter-partition communication protocols.

Consistency of the cache coherency domains is achieved through a protocol performing address verification concurrently with the bus snooping protocol. Rather than verifying the address when a transaction is put on the bus and then signaling validity of the address on the bus to other processors, the apparatus and method of the present invention snoops on requests on the bus without interfering with them. Due to the tight timing constraints on the bus, nothing can be done to these transactions.

Concurrently with the request being snooped on by all processors, the verification device determines whether the access is valid. By the time a response is issued by one of the processors, the address verification has determined whether the address is valid. A copy of data of the response is kept. In the case of an invalid access the issuing processor is immediately stopped and the memory hierarchy of the responding processor is repaired with a copy of data. This protocol has the advantage that the tight timing constraints of the communications bus snooping protocols are not violated. The advantage of this invention is that the core of symmetric multiprocessor systems, namely the processors and their built in caches, as well as the communications bus tailored to these processors, may be reused since all modifications are contained with in the memory controller.

In contrast to commonly owned, co-pending U.S. patent application Ser. No. 09/256,035 entitled "Secure Partitioning of Shared Memory Based Multiprocessor System" filed on Feb. 23, 1999, the whole contents disclosure of which is incorporated herein by reference, the present invention runs the entire SMP as a single cache coherence domain with no modifications to the system communications bus and no replication of the system communications bus. It is able to establish and provide cache coherent shared memory regions for inter partition communication. However, it does not provide 0-based memory to each partition and thus requires that the operating system software is relocatable.

The invention may use address verification mechanisms similar to the real-to-physical reaping device of Ser. No. 09/256,035, as address ranges on the communications bus must be recognized in both inventions. To that extent, similar mechanisms may be used to determine an address range hit. However, the outcome of an address range hit is utilized differently; where Ser. No. 09/256,035 uses an address range hit to relocate the real address into a physical address for memory access, the present invention uses the lack of an address range hit to abort the transaction and to reset the offending processor.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

Figure 1:
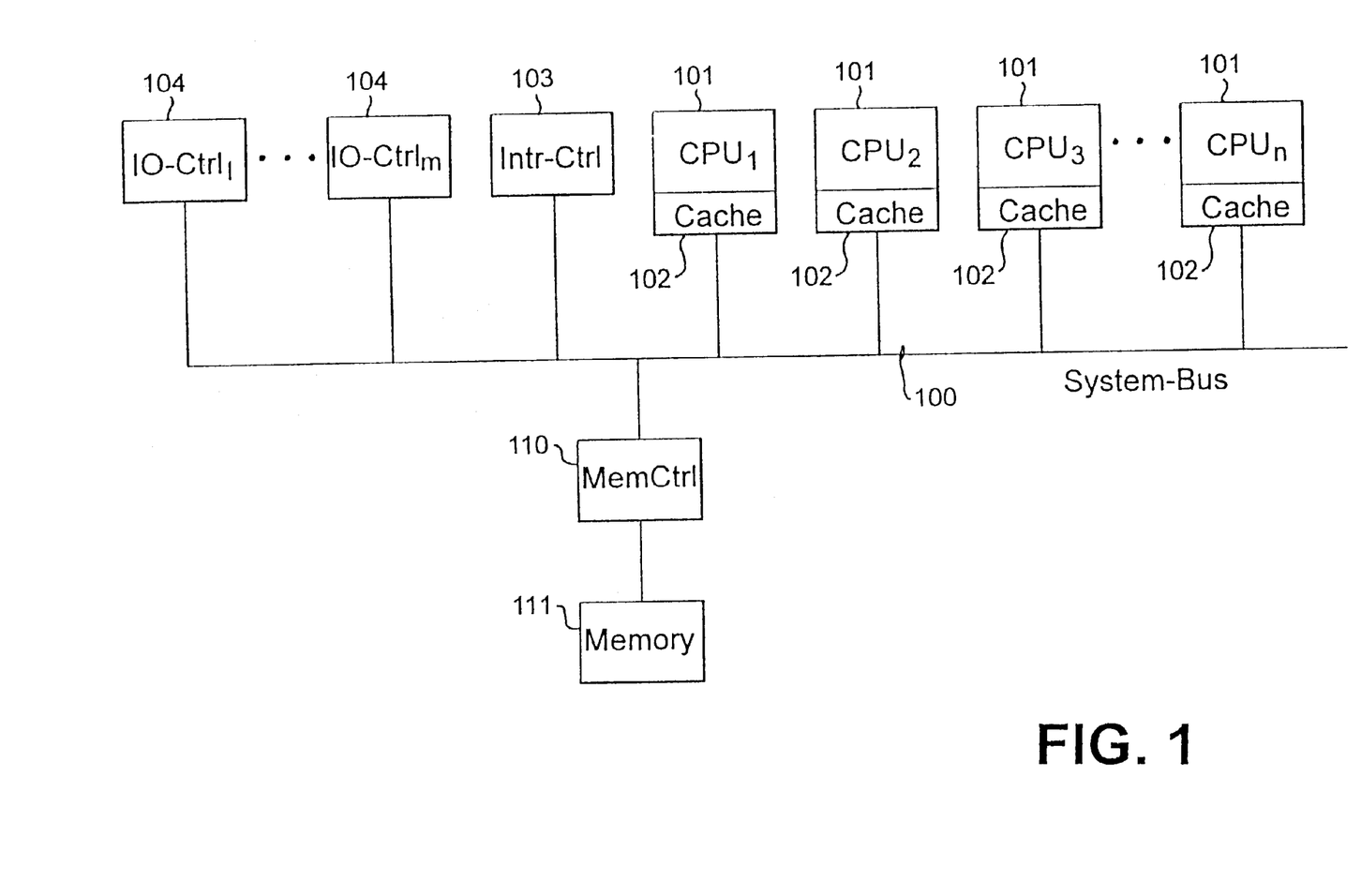
FIG. 1 is the diagram of general architecture of a shared memory based symmetric multiprocessor system.

FIG. 1 shows the general architecture of a SMP, consisting of processors 101, their associated caches 102, a system communications bus 100, a memory controller 110, a shared memory 111, an interrupt controller 103, and I/O controllers 104 which connect the system to I/O devices.

To better understand issues, arising out of running an SMP in a single cache coherency domain while partitioning the underlying memory, the various cache and memory transaction request types that may be issued on a typical SMP bus and the responses that are generated therefore are discussed below:

ReadPartial: Read un-cached memory. The memory will always respond to this request, no snooping takes place.

WritePartial: Write un-cached memory. No snooping takes place and data is pushed to the memory controller 110 for writing.

ReadLine: Reads a line into the cache 102 of the issuing CPU 101. If the cache 102 is owned by another CPU 101, that processor will respond with data. If not owned by another processor 101 the memory will respond.

ReadWithIntentToModify: Similar to ReadLine reads a line into the cache 102 of the issuing processor 101. The line is invalidated in all other processor 101 caches 102 resulting in an inter cache 102 transfer and no write back to memory 111 occurring. Otherwise memory 111 responds.

WriteLine: Write a cache line back to memory 111. No snooping takes place. A cache line may only be written back to memory 111, if the cache line is already owned by the processor 101. Ownership can only be achieved via a previous ReadWithIntentToModify.

Figure 2:
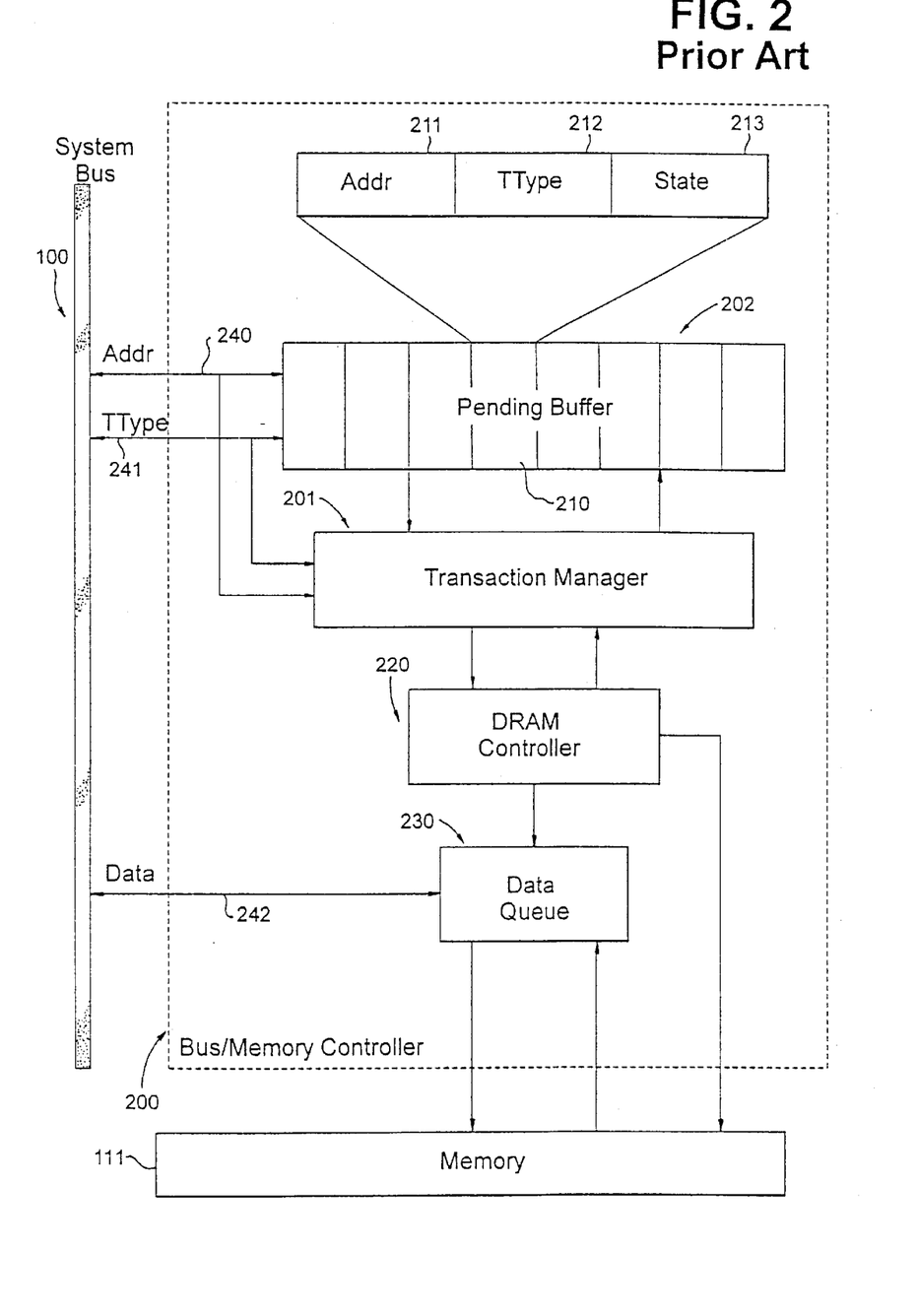
FIG. 2 is the diagram of general architecture and components of a memory controller used in a symmetric multiprocessor system.

FIG. 2 shows the general architecture of a typical communications bus and memory controller 200. When a request, identified by an address 240 and a transaction type 241, is issued on the system communications bus 100, the transaction manager 201 snoops on the system communications bus and enters a transaction descriptor 210 into a free slot of the pending buffer 202. The entry will remain in the pending buffer until the request is either filled by one of the processors 101 (FIG. 1) or by the memory 111.

The transaction descriptor 210 consists of the transaction type TType 212, the address Addr 211 and the current State 213 of the transaction. Should a request be issued on an address which already has an entry in the pending buffer, a retry will be issued to the issuing processor. In the case of a WriteLine or WritePartial transaction, the transaction manager 201 issues to the DRAM controller 220 a request to capture data 242 on data communications bus in a data queue 230. Utilizing a queue enables the buffering of several requests and hence overcomes the discrepancy between communications bus speed, i.e. potential request arrival rate, and memory access time.

Although the communications bus 100 may be released immediately for other transactions, the transaction entry 210 must reside in the pending buffer until the write data is actually flushed out of the data queue 230 into memory. This is necessary to avoid a race condition where a read access might fetch data from memory 111 while the write operation has not yet finished. In this case, as described above, a retry will be issued. In the case of a read access the data queue 230 provides the slot from where data is released onto the data communications bus, often in FIFO order to maintain memory access consistency. Upon completion of a request, the DRAM controller 220 notifies the transaction manager 201, which removes the corresponding transaction from the pending buffer and issues the appropriate response on the communications bus 100.

Figure 3:
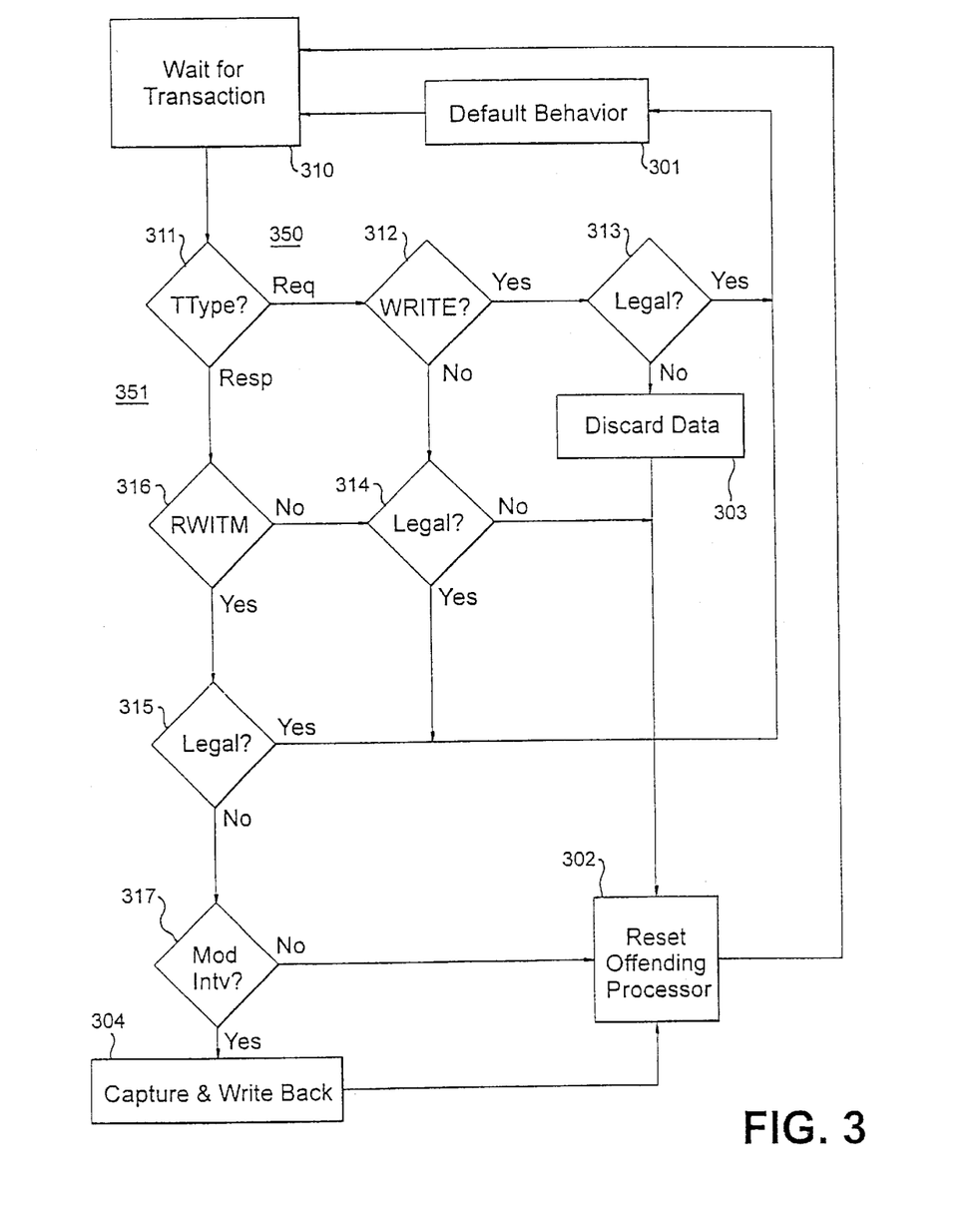
FIG. 3 is the flow diagram of transaction for maintaining proper memory fault isolation when partitioning a cache coherent symmetric multiprocessor system.

FIG. 3 shows the transaction flow which requires four functional blocks to be implemented by the memory controller:

(i) decision steps 313, 314, 315 determine whether an address is invalid in a given partition and if so mark the pending buffer state as invalid;

(ii) step 302 resets an offending processor 101 (FIG. 1);

(iii) step 303 discards data if data is not to be written to the memory 111 (FIG. 1), and (iv) step 304 captures and writes back data for memory consistency repair.

The transaction manager 201 (FIG. 2) snoops on the communications bus and waits, in step 310, for a transaction, either a request or a response to be issued by one of the processors 101 (FIG. 1). If the transaction type identifier step 311 determines that the transaction is a request 350, then at step 312 a determination is made whether it is a write or a read request. In case of a write access, i.e., WriteLine, WritePartial, if step 313 determines that the access is legal, e.g., the transaction state was not marked as invalid, then the flow passes to the Default behavior step 301 where write data to memory is executed. The transaction manager may not issue the write to memory command to the DRAM controller until the address verification has completed or alternatively requires a mechanism to withdraw the request from the DRAM controller before it is actually committed to memory. From step 301 the flow continues to step 310 to wait for the next transaction.

If step 313 determines that the access is not legal, data from the data queue 230 (FIG. 2) is discarded at step 303, and the offending processor is reset at step 302. From step 302 the flow continues to step 310 to wait for the next transaction.

If at step 312 a determination is made that the request is a request for read access from memory, either un-cached read, e.g., ReadPartiall, or a ReadLine that was not filled by any other processor, and step 314 determines that the address is invalid, then the transaction is terminated, the offending processor is reset at step 302 and the flow continues to step 310 to wait for the next transaction. However, if the issued read was legal, flow passes to the Default behavior step 301 where fill the read request from memory is executed and the flow continues to step 310 to wait for the next transaction.

If the transaction type identifier step 311 determines that the transaction is a response 351 representing a inter-cache transfer, then at step 316 a determination is made whether this is a response with respect to a ReadWithIntentTo-Modify. If not, i.e., it must be a response to a ReadLine request issued earlier, and step 314 determines that the address is invalid, then the transaction is terminated, the offending processor is reset at step 302 since the responding processor still has a valid copy of the cache line, and the flow continues to step 310 to wait for the next transaction. However, if the request was legal, flow passes to the Default behavior step 301 where the cache transaction proceeds and further action may be taken after which the flow continues to step 310 to wait for the next transaction.

The more elaborate case results out of a positive ReadWithIntentToModify response at step 316. If the request was legal then the standard behavior is implemented namely, do nothing as the inter cache transfer was legal at step 301 and the flow continues to step 310 to wait for the next transaction. However, if the request was illegal, step 317 further determines if the mode is SharedIntervention or ModifiedIntervention.

In the SharedIntervention case, a negative outcome of step 317, the offending processor is reset at step 302 because the responding processor owns the line in a shared state, i.e., the valid copy of data is still available in memory and may be re-fetched from memory by the responding processor on its next access to this line.

In a positive outcome of step 317, the ModifiedIntervention results in a cache line in a modified state referred to as a dirty cache line, i.e. the cache line is different from its content in memory, is transferred to the requesting processor without write back to memory at step 304. If not properly dealt with this case may result in memory inconsistencies. More specifically, the partition of the responding processor will have no valid copy of data once it is transferred to the requesting processor. Due to the illegality of the request, the requesting processor will be reset and the cache line content is lost. Consequently, this invention captures data of a ReadWithIntentToModify response and if the corresponding transaction is marked as illegal, data is written back to memory at step 304.

Therefore, the partition of the responding processor still has a legal copy of data in memory and subsequent accesses to this address merely results in a reload of the cache line. Semantically, a write back of the cache is forced in case of an illegal access from a different partition. This cache line write back step 304 closes the memory inconsistency hole described above.

Figure 4:
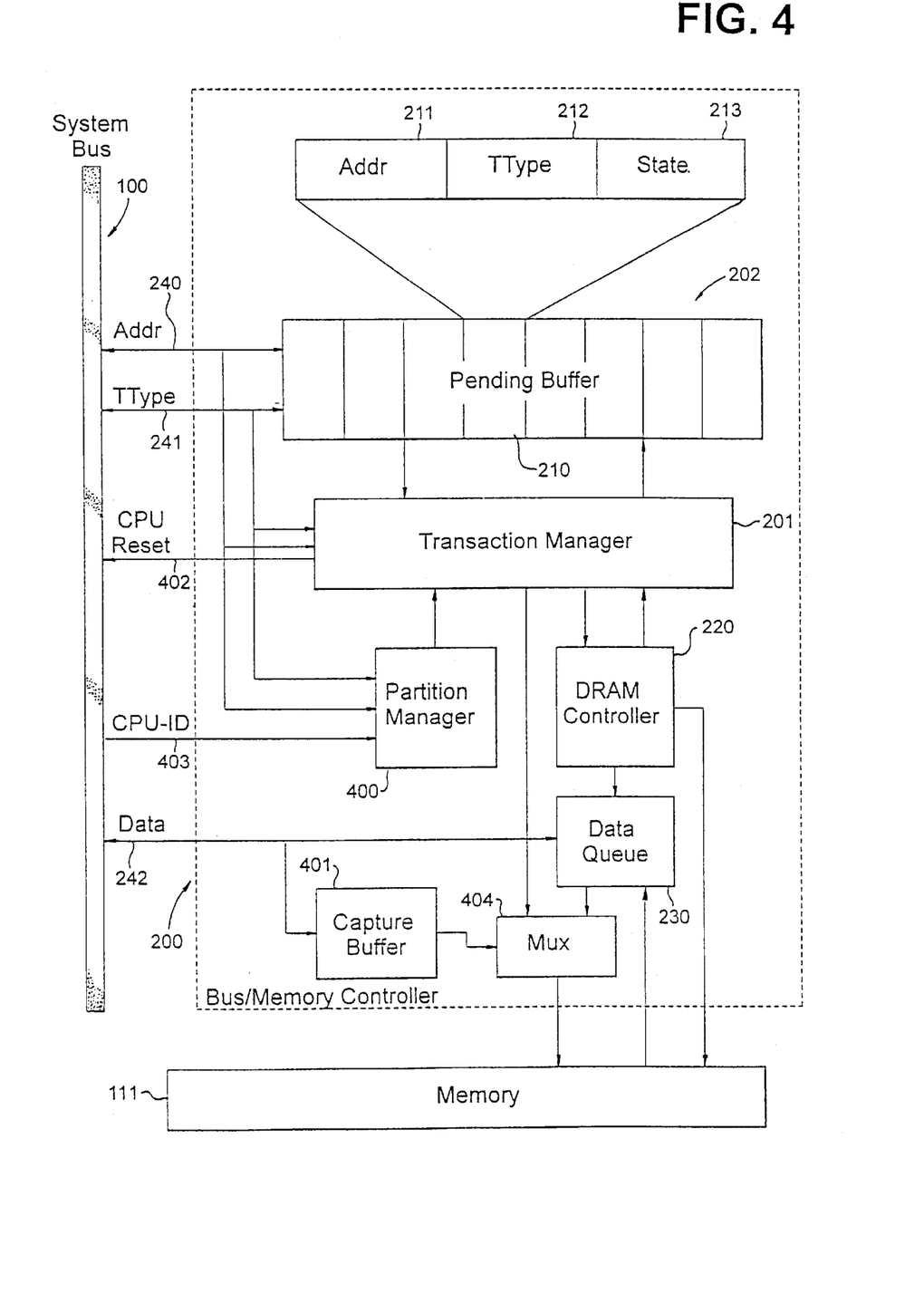
FIG. 4 is the diagram of general architecture and components of a memory controller with embedded partition management, address verification and cache coherency maintenance.

FIG. 4 shows the memory controller adaptations over the standard memory controller 220 (FIG. 2). Three new modules are added, a partition manager 400, a capture buffer 401 and a processor reset signal 402. The partition manager 400 provides a mechanism to define memory access maps for each partition and it provides the address verification mechanisms. Concurrent with the transaction manager 201, the partition manager 400 snoops as well on the communications bus for addresses 240, transaction types 241 and issuing processor ids 403, whose identity is available on the system communications bus. The partition manager 400 immediately starts to search the address map of the partition associated with the issuing processor for a memory range that holds the requested address. Dependent on the particular communications bus architecture, it is possible to start transaction processing at the time of communications bus arbitration.

At that point, though the address is not yet available, the processor id might already be available and may be used to select the appropriate partition information and address map. If the partition manager determines that the issuing processor accesses an invalid memory address that is not assigned to its partition, the transaction manager is told to mark the transaction 210 as invalid in the transactions state 213. The address map search time must be limited to the minimum possible response time of cache transactions. Since all processors must perform a lookup in their own cache for the requested address, sufficient time is available to scan even more complicated address maps, such as a two level table or a hash table. Otherwise it will flag the transaction manager 201 that the transaction is legal.

If a response passes by on the system communications bus, the transaction manager 201 marks the transaction complete and removes it from the pending buffer 202. However, if the invalid flag was raised by the partition manager 400, the transaction manager 201 immediately issues a processor reset signal 402 to the offending processor who's identify is stored in the transaction descriptor.

In addition, in a response to a ReadWithIntentToModify, the transaction manager activates the capture buffer 401 to fetch a copy of data flying by on the communications bus and instructs the DRAM controller 220 to write back data to memory. Using a MUX 404, the DRAM controller 220 steers data used to be written, to originate from the capture buffer 401 instead of the communications bus 100. Alternatively, the command set of the DRAM controller 220 could be extended to include the extra functionality of the data source, such as a communications bus or a buffer. Additionally, the capture buffer 401 may always be active in order to fetch the last data line passing on the communications bus 100.

The capture buffer 401 is introduced because in the general case the data queue may not be guaranteed to be free to hold an entry at the time the response is flying by on the communications bus 100. Since the window of opportunity where data is valid on the communications bus is small, it is better to de-couple the capture buffer from the data queue. In all cases, the capture buffer must have sufficient number of entries to guarantee that copies of cache lines may be kept for each ReadWithIntentToModify response while the DRAM controller 220 is in the progress of writing back data. Alternatively, since this is an abnormal system condition, the memory controller 220 may lock access to the communications bus 100 during the short period of "capture and write back" to repair the memory inconsistency.

Figure 5:
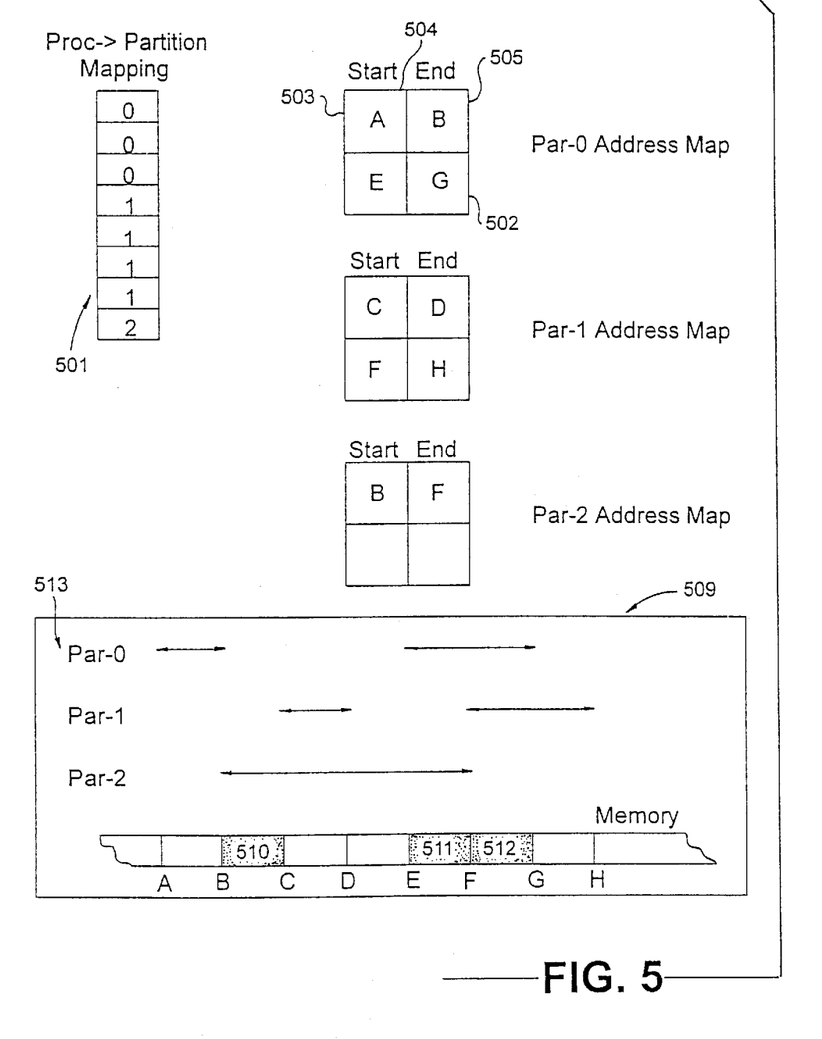
FIG. 5 is an exemplary layout of the partition management information, particularly the per partition address access map.

FIG. 5 shows one embodiment of the partition information maintained by the partition manager 400 (FIG. 4) for an 8 processor system with three active partitions. First a mapping from a processor identifier to its partition is provided via a table lookup mechanism 501. Furthermore, for each partition there exists a memory access map 502. In its most trivial form, the memory access map 502 is a two column table having rows 503 defining a valid access range, e.g., Start 504, End 505, for this partition's memory. At validation time the memory access map 502 is searched for a hit. The search may be performed in parallel by attaching an adder, subtractor and comparator with each row. For larger sets of memory regions, a balanced binary decision tree may be employed.

FIG. 5 further shows the resulting memory assignment 509 defined by the address maps 502 in which addresses are assumed to be alphabetically ordered. As shown, memory regions 510, 511, 512 may be chosen to overlap. Presently, the inter-partition cache coherent memory regions are defined, so that the partitions communicate through these regions. The establishment of shared inter partition memory regions 513 that are cache coherent, enables the efficient implementation of locking mechanisms, enabling processors to poll for lock status changes in their cache. In contrast non cache coherent shared inter partition memory regions require that the lock is checked by accessing memory, which results in increased communications bus activities.

The partition manager may configure the memory access maps 502 in accordance with instructions it receives at boot or configuration time. This configuration may be achieved in a variety of ways, for instance by writing to NVRAM (which is not accessible to the processors) via a I2C bus connected to a configuration agent such as a boot management program.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by letters patent is:

1. A method for partitioning memory in a cache coherent symmetric multiprocessor system (SMP) to provide cache coherency for inter cache transfers, the SMP comprising, a plurality of processors each associated with cache memory; a shared memory; a shared communications bus; and a memory controller, said method comprising the following steps:

subdividing said shared memory into a plurality of independent memory partitions and assigning each of said plurality of memory partitions to at least one of said plurality of processors;

executing said plurality of processors in a single cache coherence domain on said shared communications bus;

monitoring inter cache requests for cache lines by requesting processors from responding processors on said shared communications bus of the SMP for detecting if an address associated with an inter cache request for a cache line is outside of a memory partition assigned to a requesting processor; and correcting a memory partition assigned to a responding processor that responds to the inter cache request with an inter cache transfer of the cache line resulting in an illegal inter cache transfer via a write back of data representing the cache line to the memory partition assigned to the responding processor, wherein each of said plurality of independent memory partitions of said SMP retains independent fault protection properties.

2. The method of claim 1, wherein said shared memory is accessible by each of said plurality of processors via said shared communications bus.

3. The method of claim 2, wherein a memory controller provides partition address maps for specifying valid address ranges of said shared memory that each of said plurality of processors is allowed to access.

4. The method of claim 3, further establishing cache coherent inter partition shared memory regions for implementing shared locks and other inter-partition communication protocols by allowing overlaps in said partition address maps.

5. The method of claim 4, wherein said inter cache requests are monitored without introducing additional cycles on said shared communications bus.

6. The method of claim 5, wherein each of said inter cache requests is validated against said partition address maps.

7. The method of claim 6, wherein a copy of data associated with the cache line of said inter cache transfer is kept and if said illegal inter cache transfer results said kept data is used to correct said memory partition.

8. The method according to claim 1, wherein the requesting processor is reset after the illegal inter cache transfer.

9. A computer program device readable by a machine, tangibly embodying a program of instructions executable by a machine to perform method steps for partitioning memory in a cache coherent symmetric multiprocessor system (SMP) to provide cache coherency for inter cache transfers comprising a plurality of processors each associated with cache memory; a shared memory; a shared communications bus; and a memory controller, said method comprising the following steps:

subdividing said shared memory into a plurality of independent memory partitions and assigning each of said plurality of independent memory partitions to at least one of said plurality of processors;

executing said plurality of processors in a single cache coherence domain on said shared communications bus;

monitoring inter cache requests for cache lines by requesting processors from responding processors on said shared communications bus of the SMP for detecting if an address associated with an inter cache request for a cache line is outside of a memory partition assigned to a requesting processor; and correcting a memory partition assigned to a responding processor that responds to the inter cache request with an inter cache transfer of the cache line resulting in an illegal inter cache transfer via a write back of data representing the cache line to the memory partition assigned to the responding processor, wherein each of said plurality of independent memory partitions of said SMP retains independent fault protection properties.

10. The computer program device of claim 9, wherein said shared memory is accessible by each of said plurality of processors via said shared communications bus.

11. The computer program device of claim 10, wherein a memory controller provides partition address maps for specifying valid address ranges of said shared memory that each of said plurality of processors is allowed to access.

12. The computer program device of claim 11, further establishing cache coherent inter partition shared memory regions for implementing shared locks and other inter-partition communication protocols by allowing overlaps in said partition address maps.

13. The computer program device of claim 12, wherein said inter cache requests are monitored without introducing additional cycles on said shared communications bus.

14. The computer program device of claim 13, wherein each of said inter cache requests is validated against said partition address maps.

15. The computer program device of claim 14, wherein a copy of data associated with the cache line of said inter cache transfer is kept and if said illegal inter cache transfer results said kept data is used to correct said memory partition.

16. The computer program device according to claim 9, wherein the requesting processor is reset after the illegal inter cache transfer.

17. An apparatus for partitioning memory in a cache coherent symmetric multiprocessor system (SMP) to provide cache coherency for inter cache transfers comprising a plurality of processors each associated with cache memory; a shared memory; a shared communications bus; and a memory controller, wherein said processors are executed in a single cache coherence domain, said apparatus comprising:

a means for subdividing said shared memory into a plurality of independent memory partitions and assigning each of said plurality of memory partitions to at least one of said plurality of processors;

a partition manager for monitoring inter cache requests for cache lines by requesting processors from responding processors on said shared communications bus of the SMP to detect if an address associated with an inter cache request is outside of a memory partition assigned to a requesting processor; and a transaction manager for correcting a memory partition assigned to a responding processor that responds to the inter cache request with an inter cache transfer of the cache line resulting in an illegal inter cache transfer via a write back of data representing the cache line to the memory partition assigned to the responding processor, wherein each of said plurality of independent memory partitions of said SMP retains independent fault protection properties.

18. The apparatus of claim 17, wherein said shared memory is accessible by each of said plurality of processors via said shared communications bus.

19. The apparatus of claim 18, wherein a memory controller provides partition address maps for specifying valid address ranges of said shared memory that each of said plurality of processors is allowed to access.

20. The apparatus of claim 19, further establishing cache coherent inter partition shared memory regions for implementing shared locks and other inter-partition communication protocols by allowing overlaps in said partition address maps.

21. The apparatus of claim 20, wherein said inter cache requests are monitored without introducing additional cycles on said shared communications bus.

22. The apparatus of claim 21, wherein each of said inter cache requests is validated against said partition address maps.

23. The apparatus of claim 22, wherein a copy of data associated with the cache line of said inter cache transfer is kept and if said illegal inter cache transfer results said kept data is used to correct said memory partition.

24. The apparatus according to claim 17, wherein the requesting processor is reset after the illegal inter cache transfer.

25. An apparatus for controlling partitioned memory in a cache coherent symmetric multiprocessor system (SMP) to provide cache coherency for inter cache transfers, the SMP comprising a plurality of processors each associated with cache memory; a shared memory; a shared communications bus; a data queue; and a memory controller, said apparatus comprising:

a transaction manager for buffering inter cache requests for cache lines by requesting processors transmitted on the shared communications bus of the SMP;

a partition manager for monitoring the requests for the cache lines on said shared communications bus of the SMP to detect if an address associated with an inter cache request for a cache line is outside of a memory partition assigned to a requesting processor;

a capture buffer for storing a copy of data representing a cache line transferred on said communications bus in response to the inter cache request; and a multiplexer for correcting a memory partition assigned to a responding processor that responds to the inter cache request with an inter cache transfer of the cache line resulting in an illegal inter cache transfer via a write back of said stored copy of data representing the cache line to said memory partition assigned to the responding processor, wherein each of said plurality of independent memory partitions of said SMP retains independent fault protection properties.

26. The apparatus of claim 25, wherein said shared memory is accessible by each of said plurality of processors via said shared communications bus.

27. The apparatus of claim 26, wherein a memory controller provides partition address maps for specifying valid address ranges of said shared memory that each of said plurality of processors is allowed to access.

28. The apparatus of claim 27, further comprising cache-coherent inter partition shared memory regions for implementing shared locks and other inter-partition communication protocols by allowing overlaps in said partition address maps.

29. The apparatus of claim 28, wherein said inter cache requests are monitored without introducing additional cycles on said shared communications bus.

30. The apparatus of claim 29, wherein each of said inter cache requests is validated against said partition address maps.

31. The apparatus according to claim 25, wherein the requesting processor is reset after the illegal inter cache transfer.

* * * * *